US006308280B1

(12) United States Patent
Joseph et al.

(10) Patent No.: US 6,308,280 B1
(45) Date of Patent: Oct. 23, 2001

(54) SYSTEM FOR SYNCHRONIZING DISCRETE COMPONENTS TO A COMMON CLOCK SOURCE

(75) Inventors: Kuriacose Joseph, Gaithersburg; Scott Casavant, Germantown, both of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/104,466

(22) Filed: Jun. 25, 1998

(51) Int. Cl.[7] ................................. G06F 1/12; G06F 1/14
(52) U.S. Cl. ..................... 713/400; 713/503; 709/400
(58) Field of Search .................................. 713/400, 500, 713/502, 503, 600; 709/400

(56) References Cited

U.S. PATENT DOCUMENTS

| 5,579,513 | * | 11/1996 | Strohmer | 713/600 |
| 5,689,688 | * | 11/1997 | Strong et al. | 709/400 |
| 5,784,421 | * | 7/1998 | Dolev et al. | 375/354 |
| 5,809,397 | * | 9/1998 | Harthcock et al. | 455/13.2 |
| 5,818,539 | * | 10/1998 | Naimpally et al. | 348/512 |

* cited by examiner

Primary Examiner—Dennis M. Butler
(74) Attorney, Agent, or Firm—John T. Whelan; Michael W. Sales

(57) ABSTRACT

A method and apparatus for synchronizing downstream circuit boards with the clock values transmitted in the incoming bitstream of a digital broadcast data signal from a digital satellite system (DSS) or digital video broadcast (DVB) is disclosed. The disclosed embodiments use the generation of quasi-periodic interrupts which latch, at the same time for all downstream circuits, local clock times. The differences between successive local clock times are compared in downstream processors to differences between a front-end circuits locked system times to determine local clock adjustment values to synchronize downstream circuits.

16 Claims, 4 Drawing Sheets

SYSTEM FOR SYNCHRONIZING DISCRETE COMPONENTS TO A COMMON CLOCK SOURCE

BACKGROUND OF THE INVENTION (a) Field of the Invention

The present invention relates generally to a method of synchronizing discrete electronic components to a common clock source. The discrete electronic components could be two or more circuit boards in a personal computer (PC), and the common clock source could be at a remote transmission station that sends packetized data to the PC. The present invention is useful in achieving synchronization, in calibration with the clock signals transmitted in the data's bitstream, of all separately clocked circuit boards needed to receive and decode the data. The packetized data can include broadcast entertainment-type data, such as the digital video, audio, and information data signals transmitted via a variety of different digital direct broadcast satellite (DBS) systems.

(b) Description of Related Art

Conventional digital broadcast systems include a receiver station that receives and processes transmitted packets of data. One type of receiver station is part of a "wireless digital television" system known commercially by the tradename DSS®. The DSS system, which is utilized by the DIRECTV® broadcast service, allows consumers to receive directly in their homes over 175 television channels broadcast from several powerful satellites. The receiver station includes a small 18-inch satellite dish connected by a cable to an integrated receiver/decoder unit (IRD). The satellite dish is aimed toward the satellites, and the IRD is connected to the user's television in a similar fashion to a conventional cable-TV decoder.

During transmission of a digital broadcast, video, audio, and related information data signals are digitally encoded into a packetized data bitstream using a number of algorithms. The encoded data bitstream is modulated to Ku-band frequency, transmitted to the satellite, and relayed from the satellite to the 18-inch local satellite dish. The satellite dish shifts the Ku-band signal down to an L-band signal which is transmitted through the cable to the IRD.

In the IRD, front-end circuitry receives the L-band signal and converts it to the original digital data stream of video, audio, and related information signals. The incoming digital data bitstream is fed to a transport circuit which performs functions such as channel demultiplexing, decryption, and access determination. A micro-controller controls the overall operation of the IRD, including the selection of parameters, the set-up and control of components, channel selection, viewer access to different programming packages, blocking certain channels, and other functions. The data stream from the transport circuit is sent to the decompression video/audio decoder circuits. The compression and decompression of digital packetized video and audio signals may be accomplished according to the Moving Picture Expert Group (MPEG) standard for performing digital video/audio compression. Thus, the IRD unit typically includes, along with the transport circuit, an MPEG-1 or MPEG-2 video/audio decoder in order to decompress the received compressed video/audio. The decoded data from the MPEG video/audio decoder circuit is sent to a video digital-to-analog NTSC encoder and output drivers to display the broadcast signal on the users television.

An extension of the present DSS IRD system is a PC-based system that allows users to receive and display, directly into their PC's, the same digital video, audio, and related information signals received in the current DSS IRD system. The receiver station in this system includes a local satellite receiver dish similar to that of the current DSS IRD system, but the integrated receiver/decoder (IRD) functions are done within the PC architecture through the use of separate PC circuit boards. The decompressed outputs from these boards are displayed on the PC's monitor.

In general, digital video and audio signals can be transported, processed, and displayed with a high degree of quality and accuracy. The quality of digital broadcasts requires that receiver stations be able to receive and decode signals with a high degree of precision. Therefore, in order to correctly represent digital broadcast data, receiver stations must be accurately synchronized with the incoming broadcast signal's bitstream.

A typical DSS data packet's bitstream can contain, along with the actual broadcast audio/video signal, certain data packets that will be referred to herein for convenience as "time stamp data packets." Time stamp data packets contain a time stamp which may be defined as a snapshot of the system clock at the transmission facility. In the DSS system, the system clock is at 27 MHZ, and each time stamp is derived from a counter also running at 27 MHZ. The time stamps represent the instantaneous time at which the encoder as measured by the value of a 27 MHZ counter sampled at the time of its transmission. The difference between two successive time stamps represents the number of clock cycles that have occurred at the encoder between the transmission of said time stamps. As such, these time stamps are the crucial means by which the source broadcaster or uplink satellite provider can transmit the timing information of the original signal's source to the local receiver. Synchronization of the broadcast data clock with the receiver/decoder clock(s) allows the receiver station to correctly decode and display the incoming signal through proper buffering of the data. This synchronization requires that the local clocks at the receiver station be collectively locked in frequency with the uplink encoder's internal clock. A lack of timing synchronization between clocks at the receiver station, whether in the transport, audio/video decoder, or display driver, will result in eventual loss of transmitted data through either underflow or overflow of data buffers.

Buffer underflows and overflows do not occur in present DSS IRD's because the IRD typically has only one clock which is coupled to all necessary subsystems. The IRD synchronizes to this clock using known means, and uses this clock to run all necessary circuits within the IRD. The IRD's clock is synchronized by the IRD transport circuit frequency-calibrating or locking to the clock transmitted in the incoming bitstream. The transport locks to the system clock by comparing the difference between successive local transport counter times (latched at the receipt of successive system time stamps) to the difference between the successive received time stamp values. The comparison algorithm allows the local transport clock to lock onto the incoming bitstream's transmitted clock based on this comparison.

The IRD's clock, after calibration within the transport, is then coupled via hardwired connections directly to the audio/video decoder circuit within the IRD. The decoder circuit buffers the data received from the transport. It decodes the data therein buffered and sends the signal to the video encoder which converts the digital data to an analog format for display. Because this hardwired means of direct physical coupling between circuits exists, there is no lack of synchronization between the front-end transport circuit and the downstream circuit such as the MPEG video/audio decoder or the NTSC video encoder. However, in PC-based DSS or DVB systems, a number of size and architectural constraints make direct coupling of clocks to downstream circuits an impractical option. For example, the backplane of a conventional PC is not conducive to sending data in real time with fixed delay. This variable delay in moving data through a PC can be a significant problem.

There is a necessity within a PC's architecture to have the various functions of the current DSS system's integrated receiver/decoder divided among different PC circuit boards. In particular, currently available PC-based DSS receiver stations utilize a separate transport circuit board, which includes the front-end demodulation, FEC, and tuner circuitry of the current IRD, as well as the standard channel demultiplexing, decryption, and access determination components found in the IRD's transport. In addition to this transport circuit board, these PC-based systems also have a separate video/audio (MPEG) decoder circuit board for decompressing the received compressed broadcast digital video/audio data. This decoder circuit can be further divided into two separate decoder boards, one for video and the other for audio. Each of these separate circuit boards is independent of one another in that each runs on its own local or internal clock.

Generally, there are two known ways to attempt to synchronize the circuit boards within a PC-based DSS application. One approach is to provide direct physical coupling of circuit boards within the PC. However this is costly and inefficient requirement and may be virtually impossible to implement in many currently available PC architectures due to space constraints. Therefore, even though in PC-based DSS systems there are known means to lock the front-end circuit board to the incoming clock signals, there is no effective way to synchronize the downstream video decoder, audio decoder, or the video driver circuit boards by direct hardwired coupling to the transport front-end circuit. Yet, because each of these separate circuits runs on a separate clock, and because each circuit will be downstream of at least one other circuit, each circuit must be individually synchronized or locked to the timing values transmitted in the incoming bitstream's clock in order to provide accurate reception and display of broadcast digital data.

Another known approach to coupling an existing calibrated clock to downstream circuits would be through the PC motherboard's backbone bus which is connected to all PC circuit boards. However, unknown variable delays along this bus arising from processing fluctuations, variable buffering delays, physical separation between circuits, and unpredictable interrupts make it difficult to use this bus to achieve precise synchronization of downstream circuits with the incoming DSS signal.

Accordingly, for receiving and displaying DSS or DVB digital broadcast data within a PC architecture, there is a need for a method and apparatus for accurately synchronizing all the PC circuit boards which may be used in this multimedia application to the clock transmitted in the incoming data bitstream.

SUMMARY OF THE INVENTION

The present invention relates generally to a method and apparatus for synchronizing circuit boards at a receiver station to a clock signal in an incoming bitstream. More specifically, in a preferred embodiment, this synchronization occurs within a multimedia PC application wherein a DSS or DVB system's video, audio, and information data signals are received and displayed.

The DSS and DVB digital broadcast systems includes an uplink stage and receiver stage. At a satellite uplink facility, video and audio signals may be digitized in known manners, multiplexed with other data signals (such as clocks and other timing signals), compressed (if required), mated with error correction codes, modulated on a carrier, and uplinked to a geosynchronous satellite. The satellite receives the uplinked signals and rebroadcasts them over a footprint that preferably covers at least the continental United States. Receiver stations, which are typically located at the user's home, receive the satellite signals. The receiver stations each include an antenna, which preferably is in the form of a satellite dish, along with an integrated receiver/decoder (IRD). The antenna feeds the received satellite signal to the IRD unit which recovers the originally transmitted digital video, audio, and data.

The present invention relates to a similar application wherein the receiver station includes an antenna, which preferably is in the form of a satellite dish, along with a PC which, analogous to the above-described IRD, recovers the originally transmitted digital video, audio, and data. The digital broadcast data received from the satellite dish is coupled via hardwire connections directly into a transport circuit board within the PC. The PC's transport circuit board also performs initial circuit functions on the signal coupled in from the satellite, including demodulation, FEC, and tuning. The transport circuit board within the PC has a separate clock, processor, counter, and latches and performs similar functions to that of the IRD's transport circuit, including channel demultiplexing, decryption, and access determination. The received digital broadcast data is sent from the transport circuit to a separate video/audio decoder circuit. The video/audio decoder circuit has a clock, counter, processor, and latch and decompresses or decodes the received compressed broadcast signal.

Typically, within the IRD application both the transport circuit and the video/audio decoder circuit are co-synchronized in that both operate off of a single synchronized clock. In the PC-based DSS application to which the present invention relates, both circuits may operate on different clocks and therefore must be synchronized separately.

According to one aspect of the present invention, the PC transport circuit's clock is synchronized to the clock signal transmitted in the incoming bitstream by a known method. The transport circuit, upon receiving a digital broadcast data packet with timing information, generates a signal which records/latches the local transport clock time. The difference between the local clock times latched at the time of reception of two successive time stamp packets, and the time stamps transmitted in those packets, are used to re-adjust the local clock operation to ensure its synchronization with the transmitted clock.

Within the current DSS IRD, the synchronized clock of the transport circuit board could run the MPEG video/audio decoder board by directly coupling the two circuits together. This direct coupling is undesirable in PC applications, which rely on the PC motherboard's backbone bus for coupling and communication between circuits. Unpredictable variable bus delays occurring in the backbone bus prevent accurate synchronization by this method.

Therefore, in order to combat this problem, the method of the present invention provides quasi-periodic interrupts created within the PC. The quasi-periodic interrupts are sent to the front-end circuit, herein referred to as the transport, and to all downstream circuits, herein exemplified by the MPEG video/audio decoder circuit. The interrupts may be clocked by various means, including the use of a counter that resides on the PC motherboard. Using the present invention, several undesirable conditions that are usually present in known PCs are no longer critical. For example, the time interval between samples of the quasi-periodic interrupts is not critical, nor is the presence of jitter in the timing. Delays in processing interrupts at their source are also not critical. The key requirement is that these interrupts trigger time latching on each local circuit board at the same time.

The quasi-periodic interrupts trigger the storage of local timing values on latches in each of the circuits used in receiving and displaying digital broadcast data. The transport time stamp is now transmitted from the transport board to the decoder board in quasi-realtime, that is, the delays in getting this information across to the decoder subsystem is not critical, so long as the information gets across to the decoder board well before the next external interrupt is triggered.

A local downstream circuit processor compares the differences (delta) between successive values of the transport time stamp to the differences (delta) between successive values of the local time stamp. The difference between these two deltas represents the level of synchronization. The local circuit board processor, upon determining that the local clock is not accurately synchronized to the incoming data's bitstream clock, adjusts the local circuit board clock to calibrate it with the previously synchronized clock values received from the transport. It should be noted that any latched local time on the transport board can be offset by a fixed value to represent the system time. This offset can be computed by taking the difference between the value of a local time latched upon the receipt of a time stamp packet and the time stamp value itself. While the system time is not needed to lock the frequency of clock on various subsystems, it is need for audio/video synchronization and buffer management on a MPEG decoder card.

The method of the present invention may be embodied in a method of synchronizing a plurality of computer subsystems to a transmitted clock in an incoming bitstream, wherein each subsystem comprises a local clock. The method includes the steps of locking said local clock of a front-end computer subsystem with said transmitted clock received in said incoming bitstream; recording a plurality of quasi-periodic local times on said front-end computer subsystem and on each one of said plurality of downstream computer subsystems; comparing each one of a plurality of quasi-periodic local times of said front-end computer subsystem with each one of said plurality of quasi-periodic local times of said plurality of downstream computer subsystems to determine synchronization; and adjusting said local clocks of each one of said plurality of downstream computer subsystems.

The present invention may also be embodied in an apparatus for synchronizing a plurality of downstream computer subsystems to a transmitted clock of an incoming bitstream, wherein each one of said plurality of downstream computer subsystems comprises at least one clocking means for measuring a plurality of local timing values. The apparatus includes a computer having a motherboard, wherein front-end computer subsystem and said plurality of downstream computer subsystems are connected to said motherboard; a front-end computer subsystem, wherein said front-end computer subsystem comprises a local clock and means to lock said local clock to said transmitted clock of said incoming bitstream; means for generating a plurality of quasi-periodic interrupts; means for transmitting said plurality of quasi-periodic interrupts to said front-end computer subsystem and to said plurality of downstream computer subsystems, wherein each one of said plurality of quasi-periodic interrupts arrives to said front-end computer subsystem and to each one of said plurality of downstream computer subsystems at the same time; means for storing a local time on said front-end computer subsystem and each one of said plurality of downstream computer subsystems, wherein said local time corresponds to each one of said plurality of quasi-periodic source interrupts; means for comparing each one of a plurality of system times of said front-end computer subsystem with each one of a plurality of quasi-periodic local times of said plurality of downstream computer subsystems; and means for adjusting said local clocks of each unsynchronized one of said plurality of downstream computer subsystems.

The invention itself, together with further objects and attendant advantages, will best be understood by reference to the following detailed description, taken in conjunction with the accompanying drawings.

DETAILED DESCRIPTION OF THE PREFERRED EMBODIMENTS

The preferred embodiment of the present invention includes a method and apparatus for synchronizing, in calibration with the clock signals transmitted in the data's bitstream, all separately clocked PC circuit boards needed to receive and decode broadcast entertainment-type data, such as the packetized digital video, audio, and information data signals transmitted in a digital satellite system (DSS) or digital video broadcast (DVB) system. It is understood however, that the present invention can be used to synchronize clocks between different circuit boards in a more general multimedia scenario, such as in a Digital Video Disk (DVD) player, where a video/audio decoder and display controller may be on different boards and yet one may need to transmit its synchronized clock to another to achieve downstream synchronization. It is also understood, that the present invention may also be applied to computer applications other than multimedia.

Figure 1:
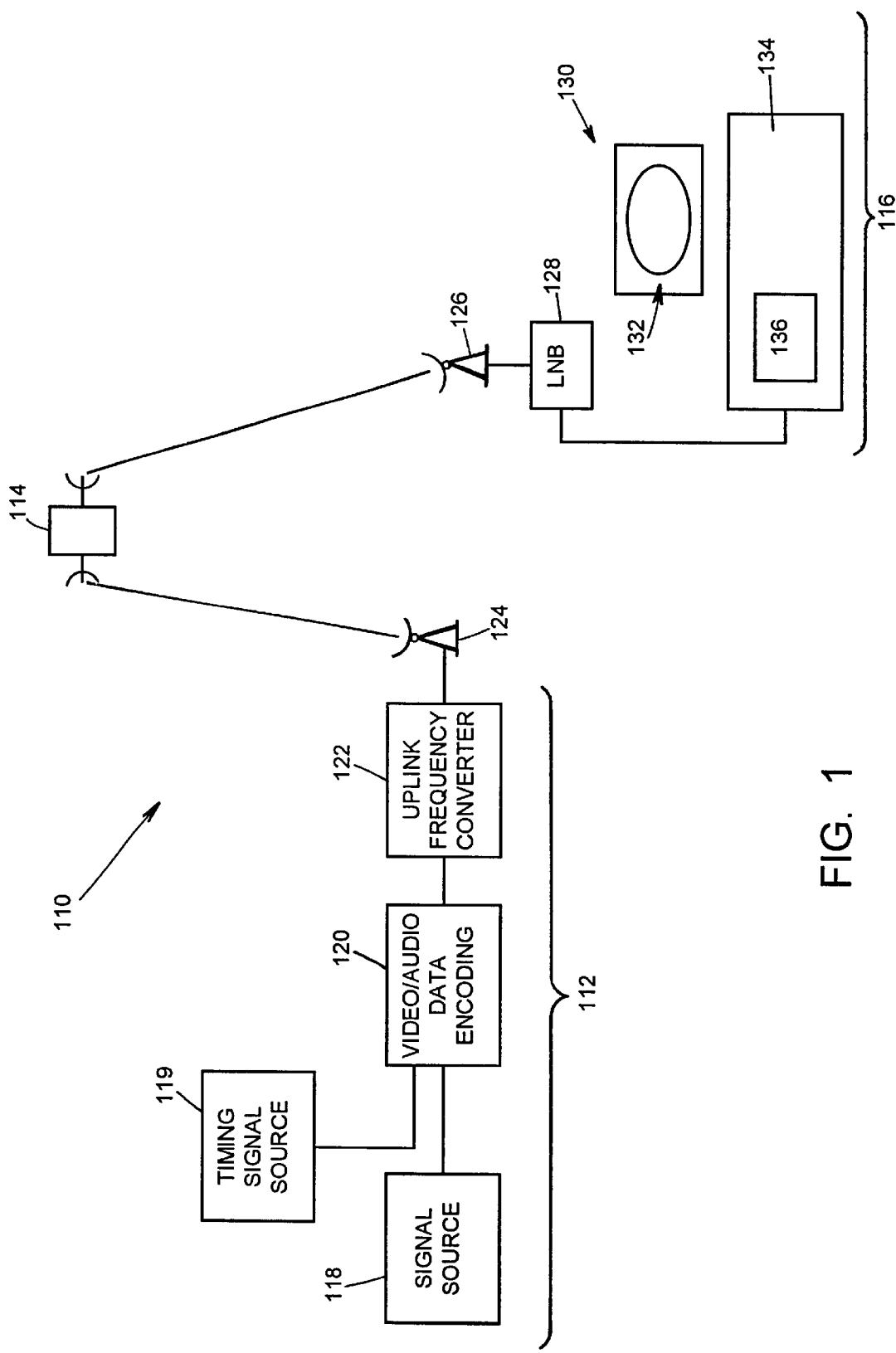
FIG. 1 is a diagram of a direct broadcast satellite system transmitting to a receiver station in which the present invention is implemented.

FIG. 1 is a block diagram of a transmission and reception system 110 embodying features of the present invention. The illustrated system 110 includes a transmission station 112, a relay 114, and a plurality of receiver stations, one of which is shown at reference numeral 116. A wireless airlink provides the communications medium between the transmission station 112, the relay 114, and the receiver station 116. The transmission station 112 includes a programming/data broadcast signal source 118, a timing signal source 119, a video/audio/data encoding system 120, an uplink frequency converter 122, and an uplink antenna 124. The relay 114 is preferably at least one geosynchronous or geo-stationary satellite. The receiver station 116 includes a reception antenna/dish 126, a low-noise-block (LNB) 128 connected to the antenna 126, a personal computer (PC) 130 having a motherboard 134 and a monitor 132, and receiver/decoder circuitry 136 connected to the PC's communication data bus. It should be noted that, while the receiver/decoder unit 136 is shown by a single block and single reference number in the preferred embodiment, the receiver/decoder functions within the PC are divided among at least two separate PC circuit boards, one performing front-end transport receiver functions, the other performing downstream decoding of video/audio signals. Both are shown in FIG. 2 (at 210, 212) and described in further detail later in this disclosure.

In operation, the transmission station 112 can receive video and audio programming from a number of sources, including satellites, terrestrial fiber optics, cable, or tape. These sources are represented by signal source 118. Preferably, the received programming signals, along with data signals such as timing signals (generated by the timing signal source 119), electronic scheduling data and conditional access data, are sent to the video/audio/data encoding system 120 where they are digitally encoded and multiplexed into a packetized data stream using a number of conventional algorithms. In a conventional manner, the encoded data stream is modulated and sent through the uplink frequency converter 122 which converts the modulated encoded data stream to a frequency band suitable for reception by the satellite 114. Preferably, the satellite frequency is Ku-band. The modulated, encoded data stream is then routed from the uplink frequency converter 122 to an uplink satellite antenna/dish 124 where it is broadcast toward the satellite 114 over the airlink. The satellite 114 receives the modulated, encoded Ku-band data stream and re-broadcasts it downward toward an area on earth that includes the various receiver stations 116. The LNB 128 of the receiver station 116 shifts the Ku-band signal down to an L-band signal which is transmitted to the PC unit 130.

Figure 2:
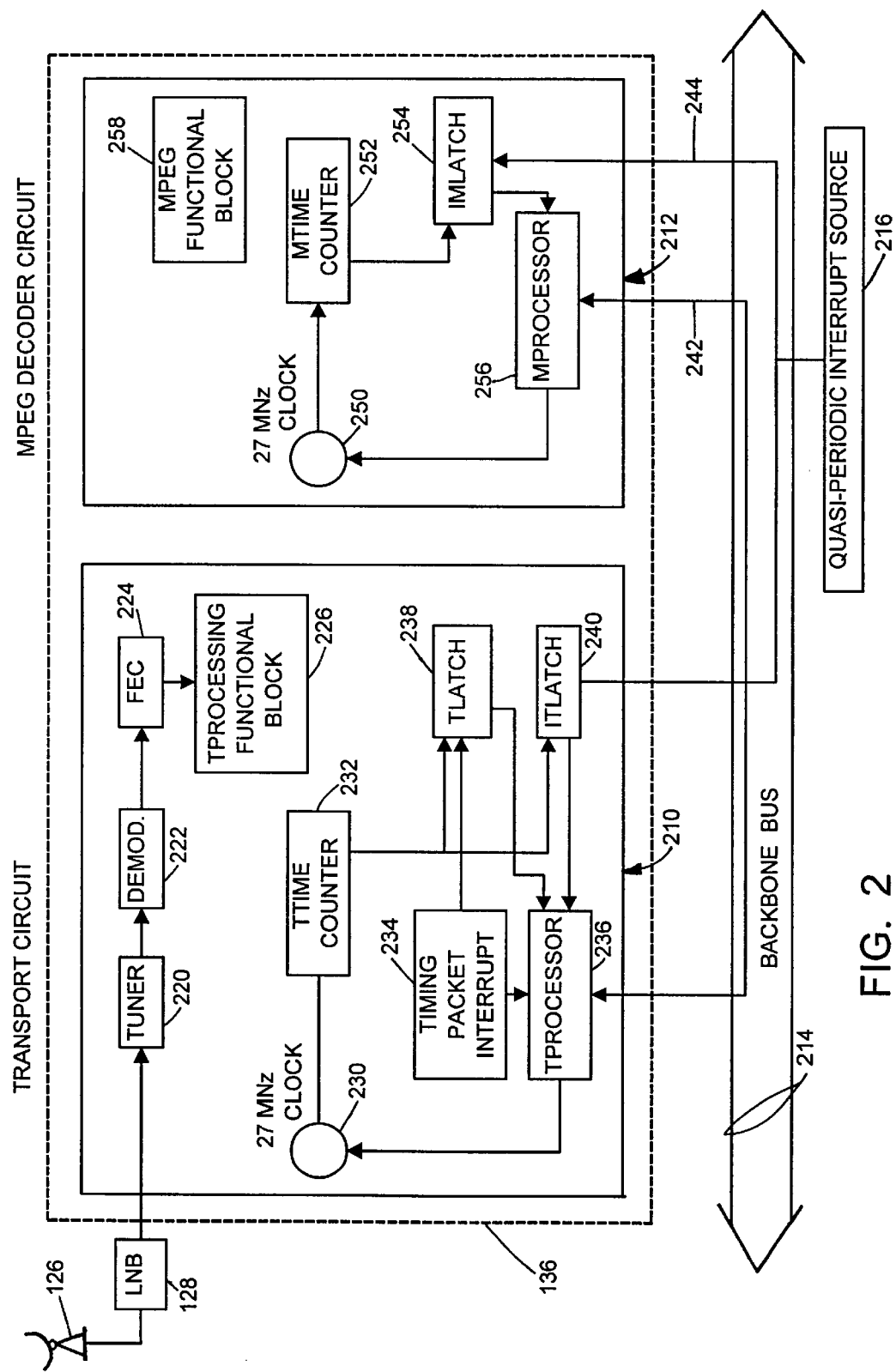
FIG. 2 is a more detailed illustration of a portion of the receiver station shown in FIG. 1

FIG. 2 is a more detailed illustration of the receiver/decoder circuitry 136 shown in FIG. 1. The receiver/decoder circuitry 136 includes several PC circuit boards that perform the functions of receiving and decoding the signal received from the LNB 128 and the satellite dish 126. The incoming signal is received by the transport circuit 210 and passed through a series of initial processing circuitry, including a tuner 220, a demodulator 222, and a FEC 224, before passing to the actual transport functional processing circuit block 226. Although the functional circuits within block 226 are not illustrated, they are identical to the channel demultiplexing, decryption, and access determination circuit blocks of a standard transport decoder.

The transport circuit 210 includes a 27 MHz local clock 230 connected to both a time counter 232 (TTIME Counter) and a transport subsystems microprocessor 236 (Transport Processor). The transport subsystems microprocessor 236, coupled to the local clock 230, controls its clocking rate by increasing or decreasing the actual oscillation speeds. TTIME Counter 232 produces a numerical value representing a series of actual clock cycles from the clock 230. Therefore, as the transport circuit is operated, the clock 230 oscillates at a frequency of 27 MHZ, and the TTIME Counter 232 increases its counter value by one from an initial zero state whenever a full clock cycle or period has occurred. For example, an elapsed time of 9.59 μsec from a 27 MHZ clock corresponds to a change in counter value of 259 clock cycles in the TTIME Counter 232.

In addition, the transport circuit 210 has a Timing Packet Interrupt Generator 234 and two clock timing value storage latches, TLATCH 238 and ITLATCH 240. In accordance with the preferred embodiment of the present invention, the Timing Packet Interrupt Generator 234, TTIME Counter 232, TLATCH 238, and Transport Microprocessor 236 operate to lock, by known means, the transport circuit board 210 to the frequency of the uplink facility clock using time stamp values transmitted in the incoming bitstream from LNB 128. The transport subsystems microprocessor 236 also controls the 27 MHZ clock 230 in a known manner so that it is locked to the transmitted clock received in the broadcast data packet bitstream from the LNB 128. A suitable process is disclosed in U.S. Pat. No. 5,381,181. Whenever a packet containing time stamps is received, an interrupt is generated by the timing packet interrupt 234 and the local time value of TTIME counter 232 is stored in TLATCH 238. The Timing Packet Interrupt Generator 234 sends the time stamp from the received signal to a memory storage location where it can be retrieved by the transport subsystems microprocessor 236. The difference of the TLATCH 238 value, representing the time in the local transport clock 230, and the time stamp within the broadcast time stamp data packet (which typically includes other information) is then obtained by the transport subsystems microprocessor 236. The difference is used to regenerate the system time, defined as the absolute time at the encoder at any given point on the transport circuit 210. Differences between successive samples of the TLATCH 238 values and successive input bitstream time stamp values, for successive time stamp data packet interrupts, are calculated and the cumulative values provide relative frequency information for the transport subsystems microprocessor 236. The transport subsystems microprocessor 236, under manufacturer-defined algorithms and calculations known by those skilled in the art, adjusts the frequency of the local 27 MHZ clock 230 to lock it to the clock of the input broadcast data bitstream.

The above-described synchronization procedure provides synchronization of the front-end circuit which initially receives the digital data packet. It is understood, that there are no constraints on the actual functional purpose, that is whether it acts as a tuner, demultiplexer, demodulator, etc., of the front-end circuit beyond that disclosed in the actual synchronization process. In the preferred embodiment, the front-end circuit is that circuit which initially processes, by any means, the digital broadcast data prior to the data entering the PC backbone bus 214. Downstream circuit boards are those that receive and process the digital data after it has left the front-end circuit and passed through the PC backbone bus 214. Described henceforth is the aspect of the present invention which actually locks the downstream circuits to the separately locked clock 230 of the front-end circuit.

FIG. 2 also illustrates an MPEG decoder circuit 212 that is one example of a downstream circuit board, though it is understood that there may be any number of downstream circuit boards all of which can be synchronized by the method and apparatus of the present invention. The MPEG video/audio decoder circuit 212 has, in addition to its MPEG Processing Functional block 258, a 27 MHZ local clock 250, a local time counter 252 (MTIME Counter) in communication with the clock 250, a local latch 254 (IMLATCH) in communication with the MTIME counter 252, and a processor 256 in communication with both the IMLATCH 254 and the local clock 250. The MPEG Processor 256 can communicate with the Transport Subsystems Microprocessor 236 through the PC backbone bus 214 connection 242. Both IMLATCH 254 and ITLATCH 240 can receive interrupts from the backbone bus 214, via a Quasi-Periodic Interrupt Source Generator ("Interrupt Generator") 216.

Figure 3:
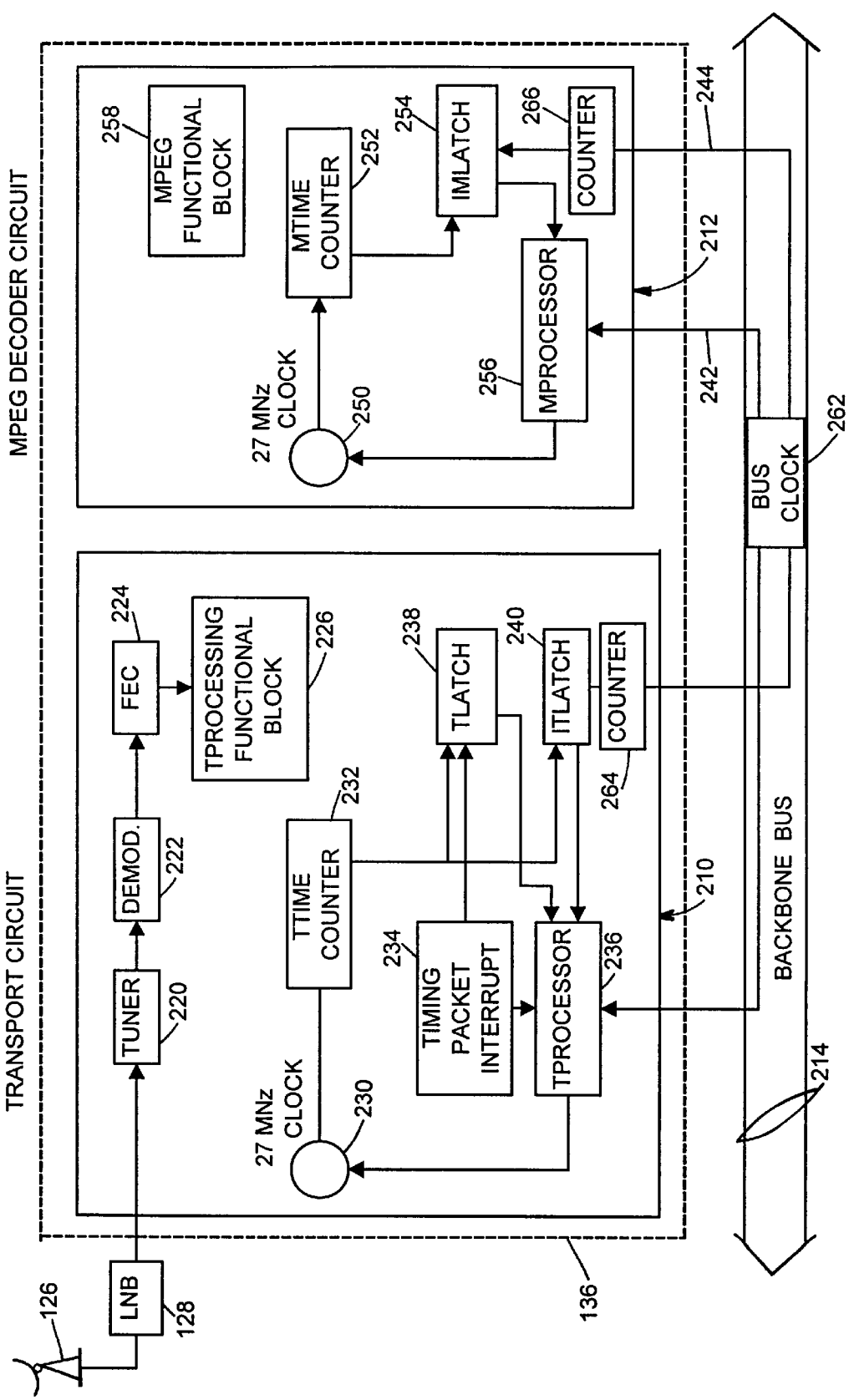
FIG. 3 more detailed illustration of an alternative embodiment of the receiver station shown in FIGS. 1 and 2.

According to the present invention, quasi-periodic interrupts are generated in the PC system by the Interrupt Generator 216. The Interrupt Generator 216 may be implemented in the PC in a variety of ways. The details of this implementation are not critical to the present invention, and designing and implementing a suitable Interrupt Generator 216 is well within the capabilities of one having ordinary skill in the relevant art. In the preferred embodiment, the Interrupt Generator 216 operates in tandem with microprocessor controlled counters 240, 254 that resides on the PC motherboard through which the backbone bus 214 is routed. An alternative implementation of the Interrupt Generator is shown in FIG. 3 and described in detail later in this disclosure. The quasi-periodic interrupts are individually coupled to the front-end circuit and each downstream circuit to be synchronized such that each indicated circuit receives the interrupt to their local latches at approximately the same time. In the preferred embodiment, wherein the system clock is approximately 27 MHZ and the typical PC transmission delays are present, interrupts arriving within a time range of 100–200nsec are treated as having arrived at the same time. A wider or smaller range may be appropriate depending on the system clock frequency and how much accuracy is desired.

As shown in FIG. 2, the quasi-periodic interrupts trigger latching at both ITLATCH 240 and IMLATCH 254 at the same time. The local time value at the transport board in ITLATCH 240 is transmitted from the transport circuit 210 to the MPEG processor 256, in quasi-realtime, through the backbone bus connection 242. Delays in getting this information across to the decoder subsystem are not critical, so long as the information gets across to the decoder board and to all downstream circuits in the case of multiple circuit boards well before the next external interrupt is triggered.

The MPEG decoder circuit processor 256 uses the time samples received from the transport subsystems microprocessor 236, and the local time sample stored at IMLATCH 254 to obtain the offset between the local MPEG clock 250 and the transport subsystem clock. The differences between successive samples of the transport subsystem clock and the local clock value stored at IMLATCH 254 that are obtained for successive external interrupts give a measure of the frequency drift between the local clock 250 and the source clock, which is the system clock transmitted in the bitstream or the locked 27 MHZ local clock 230 on the transport decoder board 210. This difference is used by the MPEG processor 256 to provide feedback control in locking its local clock 250, through known means, by either increasing or decreasing the clock frequency.

It is understood that the present invention also extends to synchronizing any number of downstream circuits. The PC-based DSS or DVB multimedia system could have one front-end transport circuit, one downstream video decoder circuit, one downstream audio decoder circuit, and one downstream output video driver circuit. To synchronize a plurality of downstream circuit boards, the transport subsystems microprocessor 236 need only send its computed system time to the processors corresponding with each individual downstream circuit. After the initial board is synchronized, the transport will initiate synchronization of all of the downstream boards, preferably simultaneously. The constraint being that the system time sent from the transport must be compared to the local time stamp of each downstream circuit board prior to that board's receipt of the next quasi-periodic external interrupt.

It is also understood that while each downstream circuit to be synchronized should have a clock, time counter, and latch, a local processor is not a necessity. One skilled in the art, given the disclosure herein, could centralize processing control through the use of any number of separate processors. Therefore, one could program a single PC processor to handle the time stamp processing, transmission of the system time, and local clock control. In accordance with the present invention, the key requirement is that the processor or processors be capable of individually controlling the time stamp processing, transmission of system time, and clock control of each local downstream circuit separately. This is required because each individual downstream circuit must be individually synchronized. It is also understood, that the processor or processors controlling each individual circuit board, whether the front-end circuit or any downstream circuits, can be programmed to synchronize different boards of different frequencies.

FIG. 3 is an alternative embodiment of the receiver station shown in FIGS. 1 and 2. The receiver station of FIG. 3 is identical to the receiver station of FIG. 2 except that it provides an alternative implementation of the Interrupt Generator. The embodiment of FIG. 3 uses the 33 MHZ clock 262, which is present on the backbone bus 214 of conventional PCs, along with counters 264, 266, to generate interrupts locally on each card (210, 212). FIG. 3 is identical to FIG. 2 except that FIG. 3 eliminates the Interrupt Generator 216 and adds the 33 MHZ backbone bus clock 262 and an Interrupt Counter 264, 266 on each card. In operation, each counter 264, 266 is designed to count a predetermined number of ticks from the backbone bus clock 262, and generate an interrupt that is provided to the latch 240, 254. Each counter 264, 262 counts the same number of ticks from the same backbone bus clock 262 such that each counter generates its interrupt in approximately equal periods of time.

Figure 4:
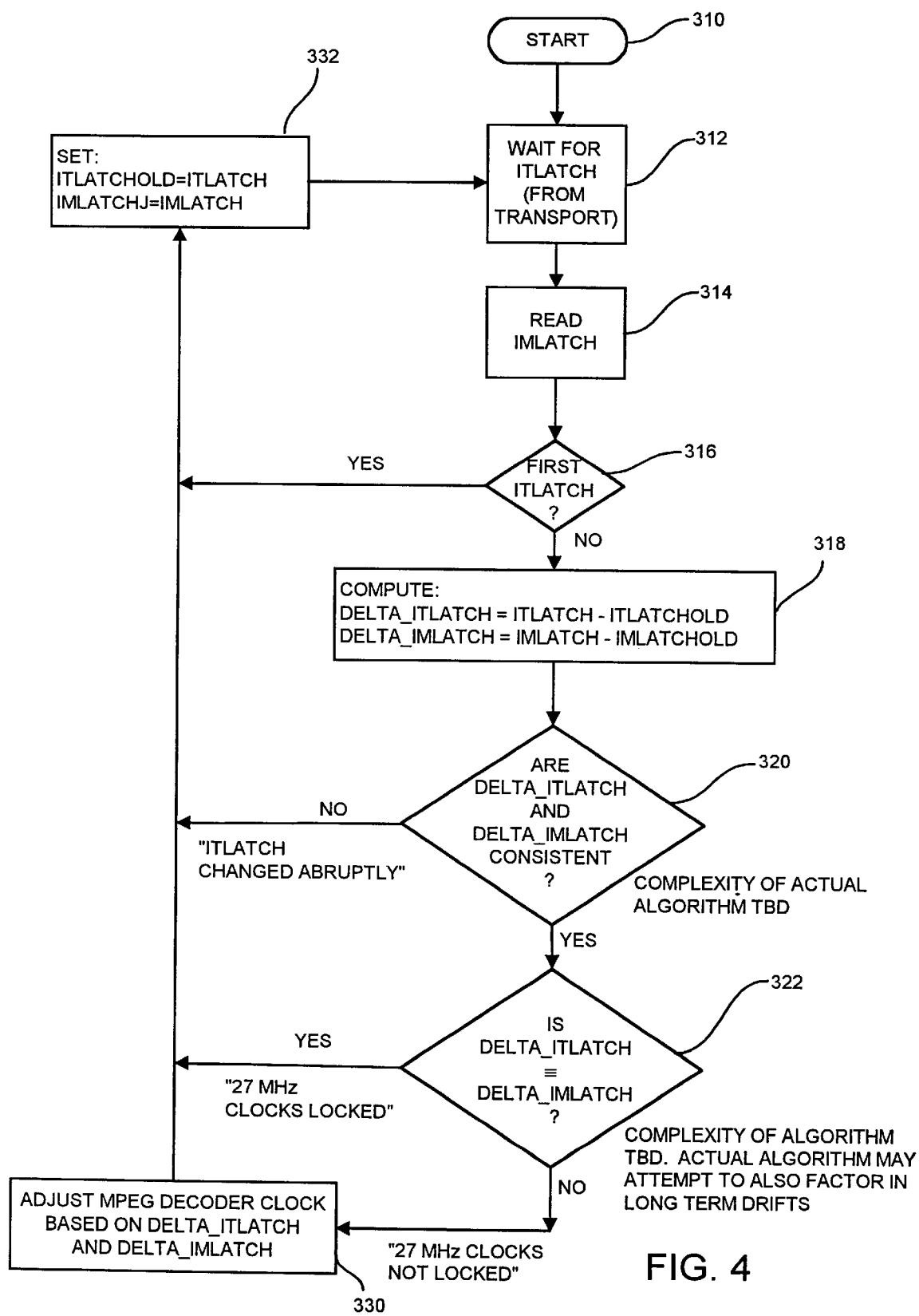
FIG. 4 is a flow diagram illustrating a preferred embodiment of the method of the present invention, implemented by the receiver station shown in FIGS. 1 and 2.

FIG. 4 is a flow diagram of the method used in locking the downstream MPEG circuit board to the front-end transport circuit and the incoming bitstream's transmitted clock. Specifically, the flow diagram indicates the logic used in the downstream MPEG decoder circuit 212. Once the MPEG circuit 212 becomes operational, usually through turning on the PC 130, the flow diagram moves from the start position 310 to the 312 standby position. The processor 256 waits at the standby position 312 until the transport subsystems microprocessor 236 receives the quasi-periodic interrupt, determines the system time of the incoming bitstream corresponding to the time of the quasi-periodic interrupt, and transmits the transport subsystem time from ITLATCH 240 to the MPEG processor 256. The processor 256 then reads the IMLATCH time value at step 314. The processor 256 then, at step 316, determines if the ITLATCH 240 value transmitted is the first such value. The synchronization procedure is designed to determine clock fluctuations between receipts of quasi-periodic interrupts. Therefore, if the ITLATCH 240 value sent from the transport subsystems microprocessor 236 corresponds to the first quasi-periodic interrupt, then at step 332 both of the current latch values, IMLATCH and ITLATCH, are stored as IMLATCHOLD and ITLATCHOLD respectively. If the ITLATCH value received at 316 is not the first such value then the procedure goes to step 318. At step 318, the processor 256 computes the change in ITLATCH and IMLATCH values between successive quasi-periodic interrupt sources. The result produced at 318 are the values DELTA_ITLATCH and DELTA_IMLATCH respectively.

The local MPEG processor 256 must now determine whether, based on the two DELTA values computed in step 318, the local clock 250 is synchronized or not. At 320, the decision block determines whether the DELTA_ITLATCH and DELTA_IMLATCH values are consistent with one another. In this instance, consistency is the key factor in determining whether the two values are relatively close to one another, by for example determining whether they are of the same order of magnitude. The complexity of the comparison step at 320 can be determined by the specific user. This step is useful in determining synchronization because when a user changes digital broadcast channels the corresponding system time of the incoming digital data packet bitstream may change abruptly to an entirely different value. Decision block 320, therefore determines, in a general way, whether the current incoming signal is tuned to the same channel as during the previous external quasi-periodic interrupt. If the two DELTA values are not consistent, the processor assumes that the digital broadcast channel has changed and, at block 332, determines that the old ITLATCHOLD value should be flushed and replaced with the current ITLATCH value.

If the processor 256 at 320 determines that DELTA_ITLATCH is consistent with DELTA_IMLATCH, then in step 322 the processor 256 determines if the two values are approximately equal to one another. As with step 320, the complexity of the algorithms at step 322 is left to the determination of the specific user but should be within the range of tolerable synchronization error appropriate for the particular application. If the two DELTA values are determined to be equal then the process is reset at step 332, then moves to step 312 and awaits the next quasi-periodic interrupt produced ITLATCH value. However, if the two DELTA values are found not to be equal then based on the magnitude and relative sign (i.e., whether DELTA_IMLATCH is greater than or less than DELTA_ITLATCH), the local MPEG decoder circuit clock 250 is adjusted by known means of increasing or decreasing the frequency.

Of course, it should be understood that a range of changes and modifications may be made to the preferred embodiment described above. For example, the present invention is described in connection with a particular hardware and processing structure for transmitting and receiving digital data. However, a wide variety of transmitting and receiving structures could be utilized as long as the essential synchronization features described herein are present. For example, the receive antennae could be larger than 18 inches to improve link margin and limit any fade outs during bad weather. The digital transmission format could be digital cable, LMDS, MMDS, or other similar formats. It is therefore intended that the foregoing detailed description be regarded as illustrative rather than limiting and that it be understood that it is the following claims, including all equivalents, which are intended to define the scope of this invention.

What is claimed is:

1. A method of synchronizing a plurality of computer subsystems to a transmitted clock in an incoming bitstream, wherein each subsystem comprises a local clock, the method comprising the steps of:

locking said local clock of a front-end computer subsystem with said transmitted clock received in said incoming bitstream; and recording a plurality of quasi-periodic local times on said front-end computer subsystem and on each one of said plurality of downstream computer subsystems; and comparing each one of a plurality of quasi-periodic local times of said front-end computer subsystem with each one of said plurality of quasi-periodic local times of said plurality of downstream computer subsystems to determine synchronization; and adjusting said local clocks of each one of said plurality of downstream computer subsystems.

2. The method of claim 1, wherein the step of recording said plurality of local times on said front-end computer subsystem and on each one of said plurality of downstream computer subsystems includes generating a plurality of quasi-periodic interrupts, wherein said quasi-periodic interrupts are generated within the computer system.

3. The method of claim 2 wherein said quasi-periodic interrupts are derived from a bus clock of an associated computer.

4. The method of claim 1, wherein the step of recording said plurality of local times includes sending each one of a plurality of quasi-periodic interrupts to said front-end computer subsystem and each one of said plurality of downstream computer subsystems to be synchronized, wherein said quasi-periodic interrupts arrive at the same time to said recording means of each one of said plurality of computer subsystems.

5. The method of claim 1, wherein the step of recording said plurality of local times includes storing said local time at the receipt of each one of a plurality of quasi-periodic interrupts, wherein there is a separate storage means for said front-end computer subsystem and for each one of said plurality of downstream computer subsystems.

6. The method of claim 1, wherein the step of comparing said local times of said front-end computer subsystem with said local times of said plurality of downstream computer subsystems includes computing a plurality of system times from said local times for said front-end computer subsystem, wherein each said system time corresponds to said local time plus an offset.

7. The method of claim 6, wherein the step of comparing said system time to said local times includes transmitting said system time value of said front-end computer subsystem and said local time values of each one of said plurality of downstream computer subsystems to a processing means.

8. The method of claim 1, wherein the step of comparing comprises comparing changes in system time between quasi-periodic interrupts to changes in said local times between quasi-periodic interrupts.

9. The method of claim 1, wherein the step of comparing comprises determining, for each quasi-periodic interrupt, if each one of said local clocks of said plurality of downstream computer subsystems is synchronized to said front-end computer subsystem's local clock.

10. The method of claim 1, wherein the step of adjusting said local clocks of each unsynchronized one of said plurality of downstream computer subsystems is carried out by a processor having a control feedback loop, whereby synchronization instructions are sent from said processor to controls that drive each local clock of said plurality of downstream computer subsystems.

11. An apparatus for synchronizing a plurality of downstream computer subsystems to a transmitted clock of an incoming bitstream, wherein each one of said plurality of downstream computer subsystems comprises at least one clocking means for measuring a plurality of local timing values, said apparatus comprising:

a computer comprising a motherboard, wherein a frontend computer subsystem and said plurality of downstream computer subsystems are connected to said motherboard;

a front-end computer subsystem, wherein said front-end computer subsystem comprises a local clock and means to lock said local clock to said transmitted clock of said incoming bitstream;

means for generating a plurality of quasi-periodic interrupts;

means for transmitting said plurality of quasi-periodic interrupts to said front-end computer subsystem and to said plurality of downstream computer subsystems, wherein each one of said plurality of quasi-periodic interrupts arrives to said front-end computer subsystem and to each one of said plurality of downstream computer subsystems at the same time;

means for storing a local time on said front-end computer subsystem and each one of said plurality of downstream computer subsystems, wherein said local time corresponds to each one of said plurality of quasi-periodic source interrupts;

means for comparing the difference between successive values of a plurality of system times of said front-end computer subsystem with the difference between successive values of a plurality of quasi-periodic local times of said plurality of downstream computer subsystems; and means for adjusting said local clocks of each unsynchronized one of said plurality of downstream computer subsystems.

12. The apparatus of claim 11, wherein said front-end computer subsystem and each one of said plurality of downstream computer subsystems comprise at least one of said storing means coupled with said clocking means for storing said plurality of said local timing values.

13. The apparatus of claim 11, wherein said clocking means and said storing means of each one of said plurality of downstream computer subsystems are controlled by at least one processing means.

14. The apparatus of claim 11, wherein means for generating a plurality of quasi-periodic source interrupts comprises a counter residing on said computer motherboard.

15. The apparatus of claim 11, wherein means for transmitting said plurality of quasi-periodic source interrupts to said plurality of downstream computer subsystems comprises a backbone bus, wherein said backbone bus is connected to said storing means, to processing means associated with each one of said plurality of downstream computer subsystems, and to said generating means creating said quasi-periodic interrupts.

16. The apparatus of claim 11, wherein said means for storing said local time on each said plurality of downstream computer subsystems comprises a plurality of interrupt triggered latches, wherein each latch is associated with no more than one of said plurality of downstream computer subsystems.

* * * * *